(12) United States Patent
Richter

(10) Patent No.: US 9,500,131 B2
(45) Date of Patent: Nov. 22, 2016

(54) SOUND-DAMPING ARRANGEMENT FOR AN ENGINE NACELLE AND ENGINE NACELLE COMPRISING SUCH AN ARRANGEMENT

(71) Applicant: Rolls-Royce Deutschland Ltd & Co KG, Blankenfelde-Mahlow (DE)

(72) Inventor: Christoph Richter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 14/851,734

(22) Filed: Sep. 11, 2015

(65) Prior Publication Data

US 2016/0076453 A1 Mar. 17, 2016

(30) Foreign Application Priority Data

Sep. 12, 2014 (DE) .......................... 10 2014 218 350

(51) Int. Cl.
*F02C 7/24* (2006.01)
*B64D 33/02* (2006.01)
*F02C 7/045* (2006.01)
*B64D 29/00* (2006.01)

(52) U.S. Cl.
CPC ................. *F02C 7/24* (2013.01); *B64D 29/00* (2013.01); *B64D 33/02* (2013.01); *F02C 7/045* (2013.01); *B64D 2033/0206* (2013.01); *F05D 2250/283* (2013.01); *F05D 2260/96* (2013.01)

(58) Field of Classification Search
CPC .................................. F02C 7/24; F02C 7/045
USPC ........................................................ 181/292
See application file for complete search history.

(56) References Cited

U.S. PATENT DOCUMENTS

| 4,106,587 A | 8/1978 | Nash et al. |
| 4,384,634 A | 5/1983 | Shuttleworth et al. |
| 4,531,362 A | 7/1985 | Barry et al. |
| 6,203,656 B1 * | 3/2001 | Syed ................... B29C 65/5057 156/292 |
| 7,857,093 B2 | 12/2010 | Sternberger et al. |
| 8,245,815 B2 | 8/2012 | Valleroy et al. |

(Continued)

FOREIGN PATENT DOCUMENTS

| DE | 2729568 A1 | 1/1978 |
| DE | 102012001571 A1 | 8/2013 |

(Continued)

OTHER PUBLICATIONS

European Search Report dated Feb. 1, 2016 for counterpart European application No. 15184891.8.

*Primary Examiner* — Jeremy Luks
(74) *Attorney, Agent, or Firm* — Shuttleworth & Ingersoll, PLC; Timothy Klima

(57) ABSTRACT

A sound-absorbing arrangement for an engine nacelle includes a first damping structure that includes a sound-damping honeycomb structure between a perforated inner layer and an outer layer, wherein the first damping structure has a first section and a second section that are arranged behind one another in the axial direction. The arrangement further includes a second damping structure that is formed in a ring-shaped manner and adjoins the first damping structure in the second section of the same in the radially external direction. The second damping structure is formed by multiple hollow chambers that adjoin each other in the circumferential direction, wherein the hollow chambers are formed without a honeycomb structure.

18 Claims, 4 Drawing Sheets

(56) References Cited

U.S. PATENT DOCUMENTS

| | | | |
|---|---|---|---|
| 8,336,804 B2* | 12/2012 | Hoetzeldt | B64C 1/40 181/288 |
| 8,506,234 B2 | 8/2013 | Brooks et al. | |
| 2003/0156940 A1 | 8/2003 | Czachor et al. | |
| 2004/0237502 A1* | 12/2004 | Moe | F02C 7/045 60/204 |
| 2009/0266642 A1 | 10/2009 | Farstad | |
| 2010/0284789 A1 | 11/2010 | Brooks et al. | |
| 2010/0284790 A1 | 11/2010 | Pool et al. | |
| 2012/0228051 A1 | 9/2012 | Drevon et al. | |
| 2013/0133977 A1 | 5/2013 | Hurlin et al. | |
| 2013/0142624 A1* | 6/2013 | Julliard | F02C 7/24 415/119 |
| 2014/0064928 A1 | 3/2014 | Todorovic et al. | |
| 2014/0090923 A1 | 4/2014 | Murray | |

FOREIGN PATENT DOCUMENTS

| | | |
|---|---|---|
| EP | 1482478 A2 | 12/2004 |
| EP | 2466095 A2 | 6/2012 |
| EP | 2620628 A2 | 7/2013 |
| FR | 2818421 A1 | 6/2002 |

* cited by examiner

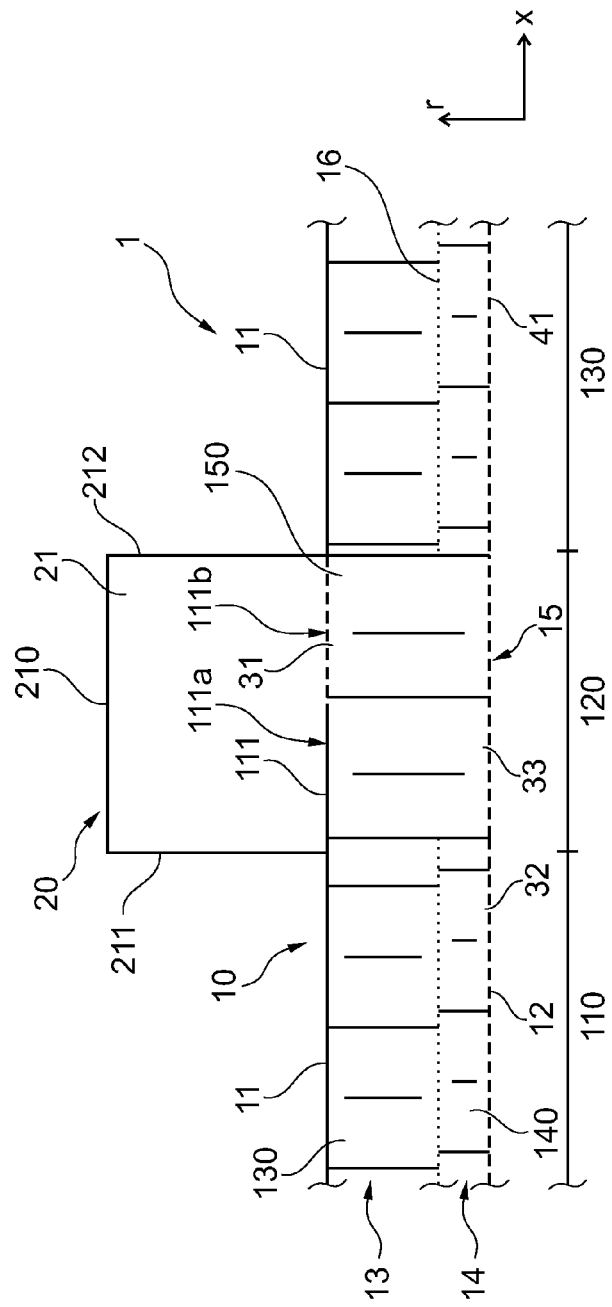
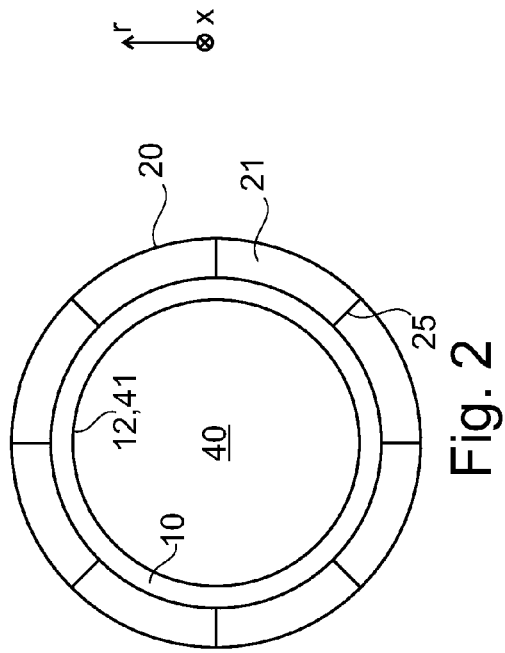

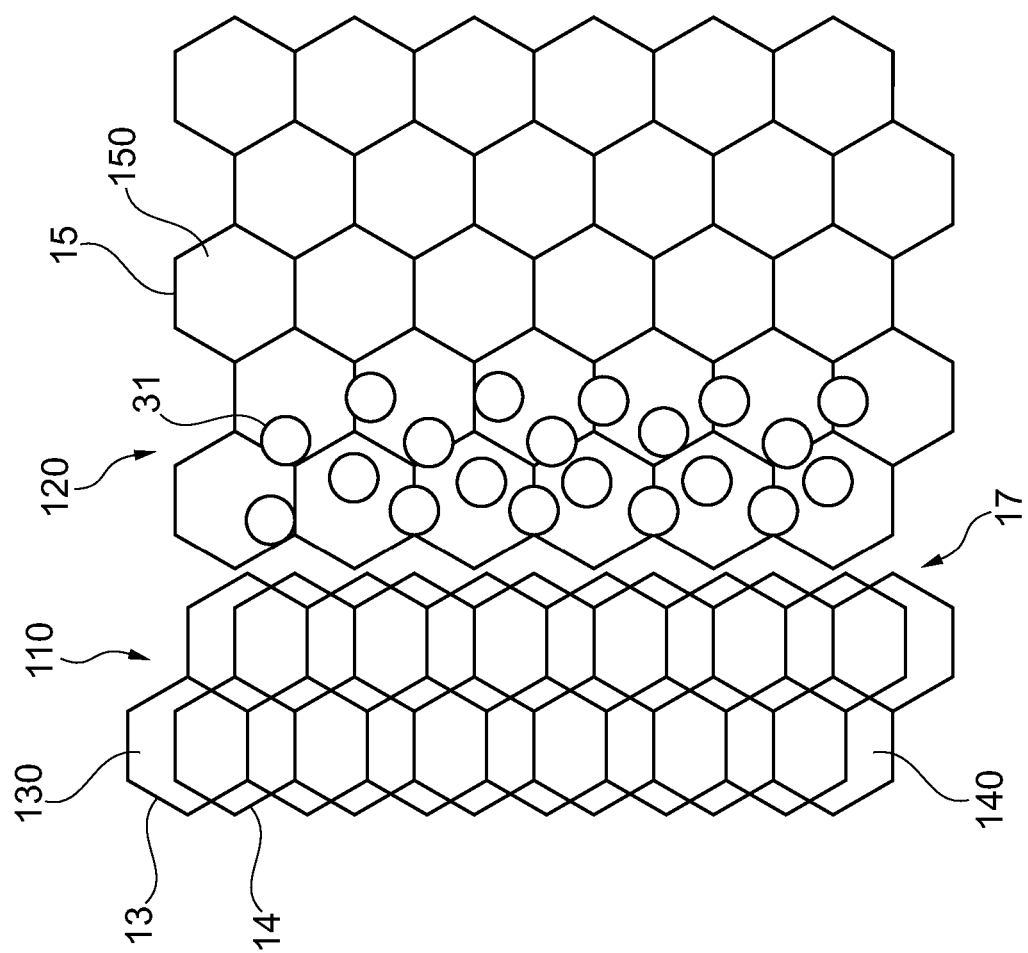

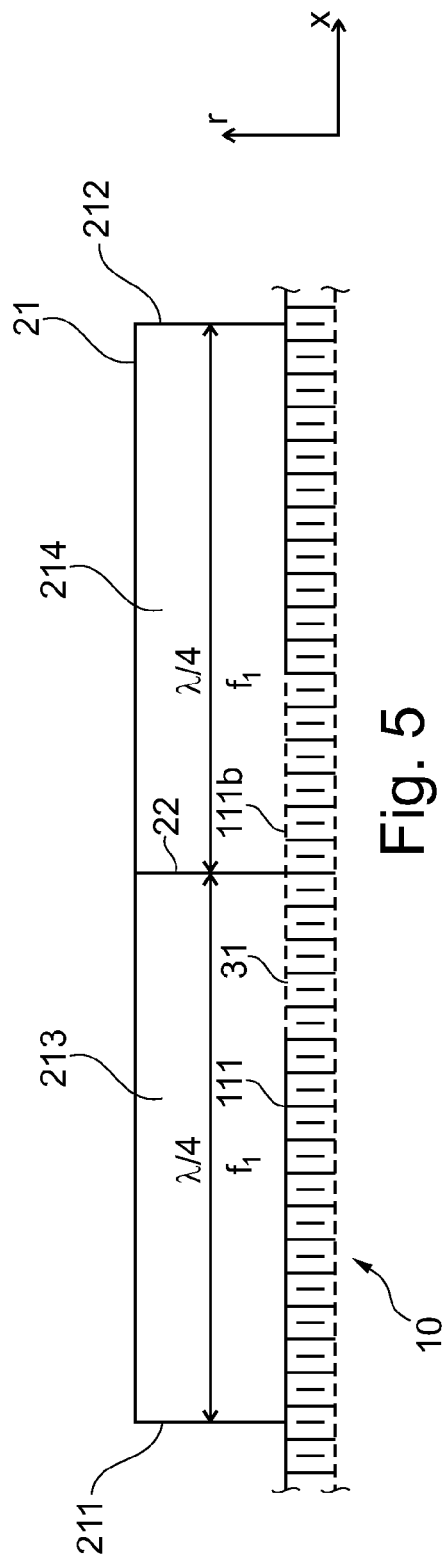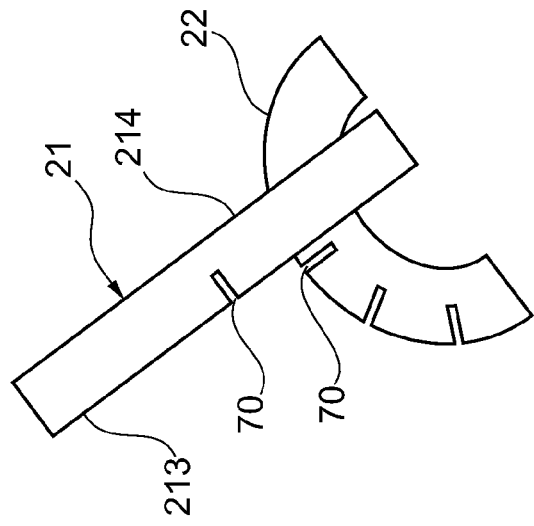

SOUND-DAMPING ARRANGEMENT FOR AN ENGINE NACELLE AND ENGINE NACELLE COMPRISING SUCH AN ARRANGEMENT

This application claims priority to German Patent Application DE102014218350.2 filed Sep. 12, 2014, the entirety of which is incorporated by reference herein.

The invention relates to a sound-absorbing arrangement for an engine nacelle according to the present description and an engine nacelle comprising such an arrangement.

In modern aircraft engines a fan is used to create a thrust, with the fan being driven by a core engine. The fan is a major source of low-frequency engine noise in the area in front of the engine, which may impact the comfort in the cabin in a negative way. In addition, coupled aeroelastic vibrations may occur as the mechanical vibrations of the fan blades and the flow surrounding them goes into resonance with the acoustic field that is formed around the fan. In order to avoid such blade vibrations it is known to integrate acoustic dampers in an engine nacelle and in particular to provide the inlet of the engine nacelle with acoustic dampers.

From U.S. Pat. No. 7,857,093 B2, a sound-damping arrangement is known that comprises a first sound-damping honeycomb structure in the inflow area of an engine nacelle. The first sound-damping honeycomb structure serves for the absorption of higher frequencies. Furthermore, a second sound-damping honeycomb structure is provided, which is arranged in a lower section of the engine nacelle and has a greater radial depth as compared to the first honeycomb structure. This second sound-damping honeycomb structure serves for the absorption of lower frequencies. A disadvantage is that the sound-damping arrangement that is known from U.S. Pat. No. 7,857,093 B2 is relatively heavy.

From EP 2 466 095 A2, a sound-damping arrangement is known that comprises damping structures which are formed in an L-shaped manner in order, so as to reduce their radial depth while still facilitating damping of relatively low frequencies.

The present invention is based on the objective to provide a sound-absorbing arrangement for an engine nacelle that is characterized by a simple structure and an effective sound attenuation. Furthermore, an engine nacelle with such an arrangement is to be provided.

This objective is solved according to the invention through an arrangement with the features described herein and an engine nacelle with the features described herein. Embodiments of the invention are also indicated in the present description.

Accordingly, the solution according to the invention provides a sound-absorbing arrangement which comprises a first damping structure that has a sound-damping honeycomb structure as well as a second damping structure without a honeycomb structure. The first damping structure has a perforated inner layer and an outer layer, with a sound-damping honeycomb structure extending in between them. At that, the first damping structure comprises at least a first section and a second section which are arranged behind one another in the axial direction.

The second damping structure is formed in a ring-shaped manner and adjoins the first damping structure in the second section of the same, outwardly with regard to the radial direction. Here, the second section of the first damping structure, to which the ring-shaped damping structure connects in the radial direction, usually, but not necessarily, has a shorter axial length than a first section of the first damping structure that is not surrounded by the ring-shaped damping structure. Further, reference is made to the fact that the first damping structure may have further sections, for example a third section, which connects to the second section in the axial direction.

According to the invention, the second damping structure is formed by multiple hollow chambers adjacent each other in the circumferential direction, wherein the hollow chambers are formed without a honeycomb structure.

The solution according to the invention provides a sound-damping arrangement in which only the first damping structure is provided with a honeycomb structure, while the second damping structure is formed without the honeycomb structure. In this manner, a simplified structure is provided and additional weight saving can be achieved. At this, the second ring-shaped damping structure is formed by multiple hollow chambers that adjoin each other in the circumferential direction, so that the occurrence of circumferential sound fields within the ring-shaped damping structure is avoided. The hollow chambers are separated from each other, for example by separation walls that are extending radially in the axial direction.

The terms "axial direction", "radial direction" and "circumferential direction" refer to the geometry of an engine nacelle or another substantially cylindrical structure inside of which the sound-absorbing arrangement is installed.

What is understood by a honeycomb structure within the meaning of the present invention is any kind of structure that is formed by a two-dimensional or three-dimensional array of hollow, adjoining cells or honeycombs that are confined by walls, respectively. The cells are usually column-shaped and have a hexagonal basic form. However, arrays with cells having another than a hexagonal basic form are also to be regarded as a honeycomb structure within the meaning of the invention.

In one embodiment of the invention, it is provided that the honeycomb structure of the first damping structure has a different design in the second section, which is adjoined by the second damping structure, than in the first section. For example, it can be provided for this purpose that, in the first section between the inner layer and the outer layer, the first damping structure comprises at least two layers in honeycomb shape that are separated from each other by a perforated septum. Here, it can be provided that the honeycombs in the two layers are arranged in such a manner that they are offset with respect to one another. In particular, separate honeycombs in the two layers which are separated from each other by the septum may be arranged offset with respect to each other.

In contrast to that, the first damping structure has only exactly one layer in honeycomb shape in the second section, which is adjoined by the second damping structure, between the inner layer and the outer layer, wherein the honeycombs continuously extend in this layer from the inner layer to the outer layer. Thus, in the area of the second damping structure, the first damping structure has a continuous honeycomb structure, which facilitates that sound waves propagate through this continuous honeycomb structure from the perforated inner layer of the first damping structure, which is impinged by the sound waves, all the way to the second ring-shaped damping structure. Here, the inner layer of the first damping structure forms an inner lining of an engine nacelle, for example.

Here, it is provided according to an advantageous further development that in the second section, adjacent to the first damping structure, the outer layer of the first damping structure is at least partially provided with perforations, in particular holes, which are formed so as to be relatively large. Via the perforations in the outer layer there is provided at least a partial fluid connection between the first and second damping structures. For example, the perforations may be formed as holes having a diameter of between 2 mm and 5 mm, in particular of approximately 4 mm. Furthermore, it can be provided that the perforations constitute between 8% and 25% of the surface of the outer layer of the first damping structure in the said section.

The hollow chambers of the second damping structure are coupled via the relatively large holes in the outer layer of the first damping structure to the air volume in the continuous honeycombs of the honeycomb structure and further via the perforations or holes provided in the inner layer of the first damping structure to acoustic vibrations that are generated in the inlet of the engine nacelle and adjacent to the fan blades. By using relatively large perforations or holes in the outer layer, the amount of the inert mass of gases, which is present in the second section of the first damping structure and has to be moved for the transmission of acoustic vibrations to occur, increases, so that high-frequency vibrations, in particular in the area of more than 500 Hz, are reflected more strongly and can enter the second damping structure to a lesser extent, so that consequently it mainly absorbs low-frequency vibrations, in particular those that are in the range between 300 and 500 Hz.

In another embodiment, it is provided that the perforations in the outer layer of the first damping structure have an arrangement which does not correspond to the arrangement of the honeycombs of the first damping structure. Hence it is not provided that each opening in the outer layer corresponds to a honeycomb of the honeycomb structure, which is formed in the second section of the first damping structure, or that the openings and the honeycombs have the same distance or form the same grid. Rather it is provided according to this embodiment that what is present is an arrangement, in which the perforations in the outer layer and the honeycombs of the honeycomb structure do not correspond to each other. Hereby, additional freedom is obtained when it comes to the embodiment of the perforations of the outer layer.

In another embodiment of the invention it is provided that the outer layer of the first damping structure has a greater thickness in the second section, which is adjoined by the second ring-shaped damping structure. For example, the thickness of the first damping structure in this area lies between 1 and 4 mm, while in the first section of the first damping structure it is only between 0.6 and 1.2 mm. An increased thickness of the outer layer in the second section further contributes to the already mentioned effect of an enhanced shielding against high-frequency engine noise by means of increasing the inertial mass that has to be moved for the transmission of acoustic vibrations.

According to another embodiment of the invention it is provided that in the second section, which is adjoined by the second damping structure, the perforated inner layer of the first damping structure has perforations or openings that have a smaller diameter or a smaller size than the perforations or openings formed in the outer layer. For example, in the second section the perforations of the inner layer of the first damping structure are formed by holes that have a diameter of between 1 and 2 mm, while the diameter of the holes in the outer layer lies preferably between 2 and 5 mm, as mentioned. For example, here the perforations of the inner layer may constitute between 5 and 15% of the surface of the inner layer of the first damping structure in the second section.

Further, it can be provided that the size of the perforations of the inner layer is different in the first section than in the second section, in particular that the size or the diameter of the perforations in the first section is smaller than in the second section.

In another embodiment of the invention it is provided that the honeycomb-shaped structure of the first damping structure is interrupted in the second section, so that there is no honeycomb-shaped structure at all in this section. This represents an embodiment with a simple construction, as it is not necessary in this variant to embody the first damping structure in the second section, which is adjoined by the ring-shaped damping structure, with a honeycomb structure that has a different structure.

In one embodiment, the hollow chambers that adjoin each other in the circumferential direction and that form the ring-shaped damping structure have a substantially square shape in the longitudinal section. They can be embodied differently with regard to their radial and axial extension.

Thus, it is provided in a first exemplary embodiment that the hollow chambers are formed either as symmetrical or non-symmetrical double chambers, wherein the two chambers of a double chamber follow each other in the axial direction and are separated from each other for this purpose by a separating wall that extends in the radial direction.

In another embodiment, it is provided that the damping ring has a larger extension in the axial than in the radial direction. Accordingly, the individual hollow chambers also have a larger extension in the axial than in the radial direction, which is achieved by forming them in an L-shaped manner, for example. Here, the longer section of the L-shape extends in the axial direction, wherein it can extend so as to at least partially adjoin or be in parallel to the first section of the first damping structure. Reference is made to the fact that hollow chambers that have a larger extension in the axial direction, such as for example L-shaped hollow chambers, are also referred to as "folded hollow chambers".

An embodiment of the hollow chambers as folded hollow chambers can also be combined with an embodiment of the hollow chambers as symmetrical or asymmetrical double chambers, wherein a double chamber is formed by two rectangular or L-shaped chambers that extend axially into opposite directions, for example.

A hollow chamber is adjusted to a certain frequency at which maximal damping occurs. As a general rule, a maximal degree of damping occurs when the depth of the hollow chamber is approximately equal to a quarter of a wave length of the acoustic wave at an adjusted frequency. What is regarded as the "depth" of the hollow chamber here is the longest extension of the hollow chamber, which can also be an axial extension. The advantage of folded hollow chambers lies specifically in the fact that, despite a primarily axial arrangement of the hollow chambers, relatively low damping frequencies and thus a low construction height can be realized.

The damping ring or the chambers forming the same can for example be made of a fibrous composite material, for example a glass fiber mix or a synthetic fiber matrix. However, since it does not take over any structural functions within the meaning of the invention, the damping ring can principally also be made of different materials.

The invention also relates to an engine nacelle, in particular an engine nacelle of a turbofan engine, wherein the engine nacelle has a sound-damping arrangement with features as described herein. Here, it is provided that the first damping structure forms a sound-damping inner lining of the engine nacelle. The second damping structure is arranged inside the engine nacelle in a radially external position with regard to the first damping structure. The sound-absorbing arrangement in this case is provided at an intake of the engine nacelle, i.e., in the area of a housing part for the fan of the jet engine.

In the following, the invention is explained in more detail by referring to the Figures of the drawing by using several exemplary embodiments. Herein:

FIG. 1 shows a longitudinal section through a first exemplary embodiment of a sound-damping arrangement that comprises a first damping structure in the form of a sandwich structure and a second ring-shaped damping structure;

FIG. 2 shows a cross-sectional view of a sound-damping arrangement of FIG. 1;

FIG. 3 shows a schematic representation of adjoining layers in a honeycomb shape of a sound-damping arrangement comprising a sandwich structure according to FIGS. 1 and 2;

FIG. 5 shows a sectional view of a third exemplary embodiment of a sound-damping arrangement; and FIG. 5A shows a schematic representation of the connection of individual structural components of the sound-damping arrangement of FIG. 5.

Figure 4:
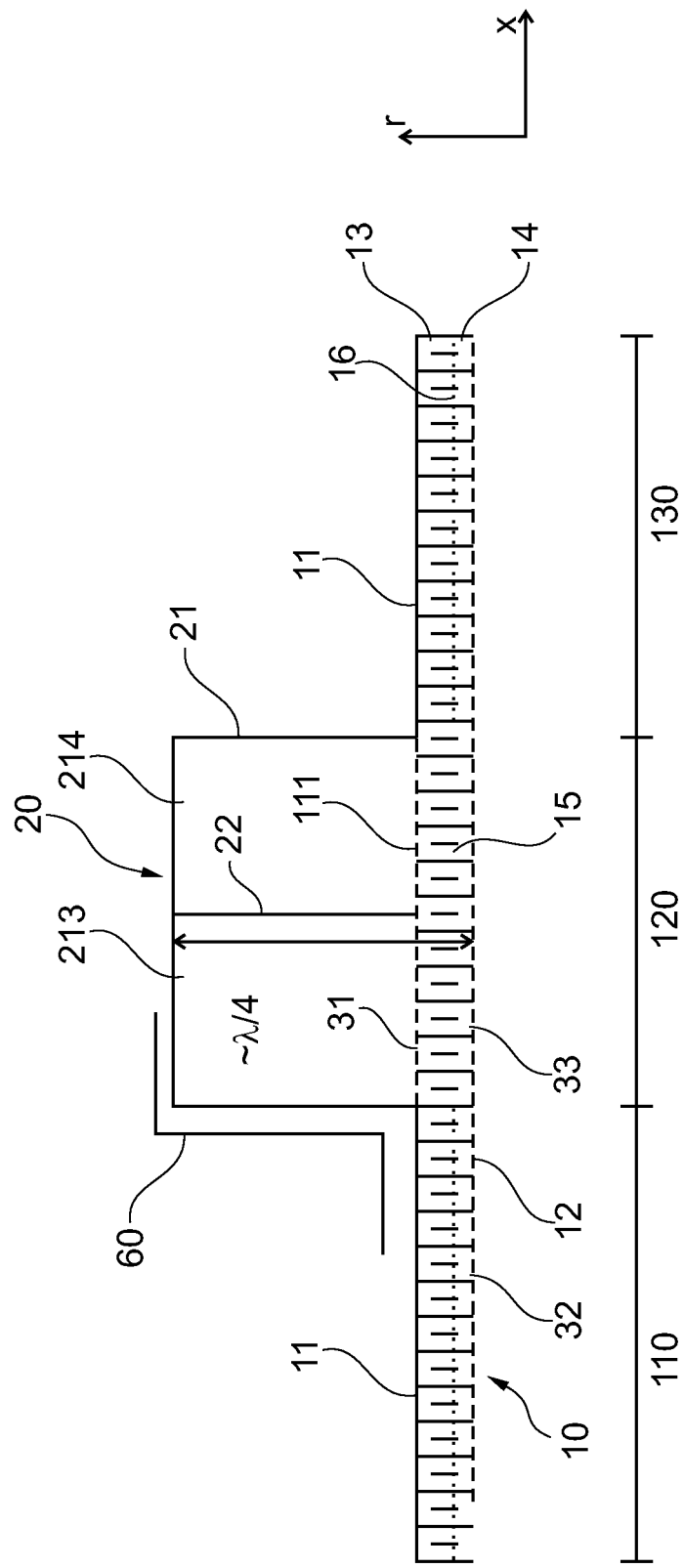
FIG. 4 shows a sectional view of a second exemplary embodiment of a sound-damping arrangement.

The FIGS. 1 and 2 show a first exemplary embodiment of a sound-damping arrangement 1 for an engine nacelle, wherein FIG. 1 shows a longitudinal section along the axial direction x and FIG. 2 shows a cross-section that is perpendicular to the axial direction x.

Referring to FIG. 1, the sound-damping arrangement 1 comprises a first damping structure 10 that is formed as a sandwich structure, and a second damping structure 20 that is formed as a ring-shaped damping structure. The sandwich structure 10 has two boundary layers or walls, namely an outer layer 11 and an inner layer 12, wherein, in a state where it is installed in an engine, the inner layer 12 forms the inner wall 41 of the inflow area of an engine nacelle that confines a flow channel 40 inside of which a fan is arranged, cf. also FIG. 2.

The sandwich structure 11 comprises multiple sections 110, 120, 130 which follow each other in the axial direction x. Here, the ring-shaped damping structure 20 adjoins the second section 120 in the radial direction. The ring-shaped damping structure 20 can also be referred to as a damping ring.

The outer layer 11 is formed by a continuous wall which only in the area of the ring-shaped damping structure 20 is partially provided with perforations 31, as will be explained in more detail below. The inner layer 12 also has perforations 32, 33 through which sound waves can penetrate into the absorbing structure 1. Here, the perforations can have a different size in the sections 110, 130 than in the section 120, which is adjoined by the ring-shaped damping structure 20, in particular different hole patterns may be provided for the respective perforations.

A sound-damping honeycomb structure comprising structures 13, 14 and 15 extends between the perforated inner layer 12 and the outer layer 11. In the sections 110 and 130, the sound-damping honeycomb structure is formed by two layers 13, 14 in a honeycomb shape comprising honeycombs 130, 140. The two layers 13, 14 are separated from each other by a perforated septum 16 that extends in the axial direction. In section 120, which is adjoined by the ring-shaped damping structure 20, a honeycomb structure 15 that is formed by only one layer of honeycombs 150 is provided, which extend continuously from the inner layer 12 to the outer layer 11.

As has already been mentioned, the outer layer 11 is formed as a continuous structure and comprises a section 111 which corresponds to the section 120 of the sandwich structure 10 and to which the ring-shaped damping structure 20 connects. In this section 111, a subsection 111a that is not perforated and another subsection 111b that has perforations 31 are provided. The perforations 31 are formed by holes that have a diameter between 2 and 5 mm, for example. They form a surface area of between 8 and 25% of the section 111b, for example. The holes are for example drilled into the outer layer 111, for example by means of sandblasting or a water jet cutter, wherein a masking appliance can be used.

Here it can be provided that the outer layer 11 has a greater thickness in the section 111, which is adjoined by the ring-shaped damping structure 20, than in the other sections 110, 130. For example, the thickness in the section 120 lies at 1 to 4 mm, while it lies at 0.6 to 1.2 mm in the sections 110, 130. Accordingly, hole patterns and layer thicknesses in the sections 110, 130 may differ from each other.

The perforations 32, 33 in the inner layer 12 can have different sizes in the first section 110 than in the second section 120, or alternatively they can be formed so as to have the same size. In the shown exemplary embodiment, the openings 33 have a smaller size in section 110 and in section 130 than in section 120. For example, the openings 33 in section 120 have a size of between 1 and 2 mm, wherein they uncover from 5 to 15% of the surface of this section.

The perforation 32, 33 could also be provided by means of mechanical processes such as sandblast cutting or water jet cutting with or without a masking appliance, for example.

The ring-shaped damping structure 20 comprises a plurality of hollow chambers 21 that are respectively formed without a honeycomb structure and are hollow inside. Here, a plurality of hollow chambers 21 adjoin each other in the circumferential direction of the engine nacelle, cf. FIG. 2. At that, the individual hollow chambers 21 are separated from each other by separation walls 25 that extend radially in the axial direction. Here, the number of hollow chambers 21 is rather small and lies at three to twenty, for example.

The individual hollow chambers 21 are confined radially internally by the outer layer 111 of the sandwich structure 10 and radially externally by a gas-impermeable exterior wall 210. Further, they comprise a front side 211 and a back side 212. The hollow chambers 21 may for example consist of a fibrous composite material, for example a fibrous composite material with a glass fiber matrix or a carbon fiber matrix.

As has already been mentioned, the sound-damping arrangement is provided for the purpose of lining and structuring the inlet of an engine nacelle at its inside. Accordingly, the sandwich structure 10 and the ring-shaped damping structure 20 are formed in a ring-shaped or cylindrical or barrel-shaped manner and extend over 360° or at least a substantial portion thereof. At that, they have a certain width in the axial direction x and a certain height in the radial direction r. The inner layer 12 and the outer layer 11 are likewise formed in a ring-shaped or cylindrical or barrel-shaped manner and extend over 360° or at least a substantial portion thereof.

As can be seen from FIG. 1, the width of the section 120, which is adjoined by the ring-shaped damping structure 20, is smaller than the added width of the first and the second section 110, 130. The thickness of the sandwich structure 10 results from the distance between the inner layer 12 and the outer layer 11.

The sandwich structure 10 primarily serves for damping high-frequency acoustic vibrations, in particular in the range between 500 Hz and 10 kHz. The ring-shaped damping structure 20 primarily serves for damping low-frequency acoustic vibrations in the area of below 500 kHz. The damping structure 20 has hollow chambers 21 that are adjusted to a frequency in the range between 300 Hz and 400 Hz, for example.

Due to its larger radial extension, the ring-shaped damping structure is suited for damping low-frequency acoustic vibrations. As shown in FIG. 1, it can be provided here that the individual hollow chambers 21 are "folded", in the sense that their walls 211, 212 that are spaced apart from each other in the axial direction have a greater distance than their walls 111, 210 that are spaced apart from each other in the radial direction, providing a resonance space for the purpose of sound absorption. Accordingly it is not absolutely necessary that perforation 31 of the outer layer 111 is perforated in section 120 of the sandwich structure in this entire section. As is shown, the perforation 31 can also be provided only in a partial section 111b. The sound coupling into the hollow chamber 21 is effected via this section 111b.

Here, the coupling-in of acoustic waves is effected via the perforations 33 of the inner layer 12 in section 120 of the sandwich structure 10, the honeycombs 150 of the layer 15 that extend continuously from the inner layer 12 to the outer layer 11, and the openings 31 in the outer layer 111b. Because the openings 31 are formed to be relatively large as well as due to the fact that the outer layer 11a is formed so as to be thicker in section 120 than in the sections 110, 130, an increased inertial mass of air and material of the outer layer is provided, which serves as a filter for higher frequencies, so that it is increasingly only the lower frequencies to be absorbed that enter the ring-shaped damping structure 20. The medium and higher frequencies of acoustic noise are absorbed by the sandwich structure 10.

FIG. 3 shows sound-damping honeycomb structures of a sandwich structure 10 according to FIG. 1, wherein the inner layer 12 and the outer layer 11 are not shown. Of the outer layer 11, only the perforations or openings 31 are shown.

As can be seen, in section 110 the sandwich structure 10 is formed by two layers 13, 14 in a honeycomb shape comprising honeycombs 130, 140. Here, the respective cells or honeycombs 130, 140 are arranged so as to be offset with respect to one another. In the section 120, which is adjoined by the ring-shaped damping structure 20, only one layer 15 in a honeycomb shape is provided, which comprises honeycombs 150 that extend continuously from the inner layer to the outer layer. In the layers 13, 14 separate honeycombs may be arranged with an offset with respect to each other, whereas in section 120 a continuous honeycomb structure is provided. Reference is made to the fact that the schematically shown holes 31 of the exterior wall that are formed in this section 120 do not correspond to the number and distance of the individual cells or honeycombs 150 of layer 15 with regard to the number and spacing to each other, but rather form an arrangement and spacing that is different from the honeycomb structure. Here, it can be provided that the openings 31 have a different pattern than the honeycombs 150 or are formed so as to be pseudo-static, without having a concrete pattern.

Further, it can be provided that an intermediate area 17 is provided between the double-layer structure in section 110 and the single-layer structure in section 120, in which the double-layer structure is transferred into a one-layer structure.

FIG. 4 shows an embodiment of the arrangement of FIG. 1, in which the individual hollow chambers 21 of the ring-shaped damping structure 20 are respectively formed as symmetrical or non-symmetrical double chambers with two chambers 213, 214 that are separated from one another by a separating wall 22 which extends in the radial direction. Just like the double chamber 21, the separating wall 22 is formed from a fibrous composite material, for example.

In addition, the ring-shaped damping structure 20 can be secured at the outer layer 11 of the sandwich structure 10 by a schematically shown fiber layer 60. This also applies to the other exemplary embodiments. Apart from that, the damping structure 20 can be attached at the outer layer 11 by adhesive bonding, for example.

It is shown in FIG. 4 that the radial height of the double chamber 21 or of the two symmetrical single chambers 213, 214 lies at approximately λ/4 of the wave length, which corresponds to the frequency to which the hollow chamber is adjusted, i.e. at which it shows the highest degree of absorption. Thus, it has turned out that a distance of λ/4 is suited best for effecting an absorption in sound waves with a wave length λ.

It may be pointed out that in an exemplary embodiment of FIG. 4, perforations 31 are formed throughout the entire section 111 of the exterior wall 11. Otherwise, the design of the sandwich structure 10 is the same as the one of FIG. 1.

In a modified embodiment of FIG. 4, the realization of the inner separating wall 25 is foregone.

FIG. 5 shows another embodiment of the arrangement of FIG. 1, in which the hollow chambers 21 are also formed as double chambers 213, 214, but at the same time have a larger extension in the axial direction x than in the radial direction r. In the axial direction, each double chamber 213, 214 forms a resonance space of the length λ/4 between the walls 211 and 22 or between the walls 22 and 212. Here, the two double chambers 213, 214 can be adjusted to the same frequency $f_1$ or alternatively to different frequencies $f_1$, $f_2$, wherein in the latter case they have a different length in the axial direction.

In the embodiment of FIG. 5, perforations 31 are formed only in a subsection 111b of the section 111 of the exterior wall, so that the perforations 31 extend only along a partial section of the double chambers 213, 214. The arrangement of the double chambers 213, 214 is also referred to as a folded one, because the larger extension is in the axial direction. Nevertheless, coupled-in sound waves of the wave length λ or the frequency f as well as bordering frequencies can be damped via the perforations 31 over a certain spectral range. As has already been mentioned, chambers 213, 214 can also be adjusted to different frequencies.

Reference is made to the fact that in an exemplary embodiment of FIG. 5 the sandwich structure 10 as a whole is formed in a one-layer configuration.

FIG. 5A shows, in a schematic and exemplary manner, the connection of a separating wall 22, which extends in the circumferential direction, to a symmetrical double chamber 213, 214. The connection between the separating wall 22 and the double chamber 213, 214 is made in a simple manner by means of plugged connections, which are realized by means of slits 70.

With regard to its embodiment, the invention is not limited to the exemplary embodiments described above. For example, the shape and the size of the hollow chambers of the ring-shaped damping structure should be understood to be merely examples and can be formed differently in alternative embodiments. The same applies to the embodiment of the sandwich structure.

The invention claimed is:
1. A sound-absorbing arrangement for an engine nacelle, comprising:

a first damping structure that comprises a sound-damping honeycomb structure between a perforated inner layer and an outer layer, wherein the first damping structure has a first section and a second section which are arranged behind each other in an axial direction, and a second damping structure that is formed in a ring-shaped manner and adjoining the second section of the first damping structure externally in a radial direction, wherein the second damping structure is formed by multiple hollow chambers adjacent to each other in a circumferential direction, wherein the hollow chambers are formed without an internal honeycomb structure, wherein at least one of the hollow chambers includes a hollow open interior with a first the at least one hollow chamber to fluidly couple the interior of the at least one hollow chamber to the first damping structure, the second side of the at least one hollow chamber being fluidly closed to the first damping structure except through the first side.

2. The arrangement according to claim 1, wherein the hollow chambers are separated from each other in the circumferential direction by separation walls.

3. The arrangement according to claim 1, wherein the honeycomb structure of the first damping structure has a different configuration in the second section, which is adjoined by the second damping structure, than in the first section.

4. The arrangement according to claim 1, wherein, in the first section between the inner layer and the outer layer, the honeycomb structure of the first damping structure has at least two layers in honeycomb shape that are separated from each other by a perforated septum.

5. The arrangement according to claim 4, wherein the honeycomb shapes in the two layers are arranged so as to be offset with respect to one another.

6. The arrangement according to claim 1, wherein, between the inner layer and the outer layer in the second section that is adjoined by the second damping structure, the honeycomb structure of the first damping structure forms exactly one layer in honeycomb shape, which has honeycombs that extend continuously from the inner layer to the outer layer.

7. The arrangement according to claim 6, wherein, in the second section that is adjoined by the second damping structure, the outer layer of the first damping structure is at least partially provided with perforations.

8. The arrangement according to claim 7, wherein the perforations are formed as holes with a diameter between 2 mm and 5 mm.

9. The arrangement according to claim 7, wherein the perforations constitute between 8% and 25% of a surface of the outer layer of the first damping structure in the perforated section.

10. The arrangement according to claim 7, wherein the perforations in the outer layer of the first damping structure have an arrangement that does not correspond to an arrangement of the honeycombs of the layer in honeycomb shape.

11. The arrangement according to claim 7, wherein the outer layer of the first damping structure has a greater thickness in the second section that is adjoined by the second damping structure.

12. The arrangement according to claim 11, wherein, in the second section that is adjoined by the second-damping structure, the perforated inner layer of the first damping structure has perforations that have a smaller size than the perforations that are formed in the outer layer.

13. The arrangement according to claim 1, wherein the sound-damping honeycomb structure is interrupted in the second section of the first damping structure.

14. The arrangement according to claim 1, wherein the hollow chambers are formed as symmetrical or asymmetrical double chambers and for this purpose have respectively one separating wall that extends in the radial direction.

15. The arrangement according to claim 1, wherein the second damping structure has a larger extension in the axial than in the radial direction.

16. The arrangement according to claim 15, wherein the hollow chambers of the second damping structure are formed in an L-shaped manner.

17. The arrangement according to claim 1, wherein the second damping structure is formed by a fibrous composite material comprising a glass fiber or carbon fiber matrix.

18. An engine nacelle of a turbofan engine, comprising a sound-damping arrangement with the features of claim 1, wherein the first damping structure forms a sound-damping inner lining of the engine nacelle and the second damping structure is arranged inside the engine nacelle radially externally with respect to the first damping structure.

* * * * *